Figure 2:
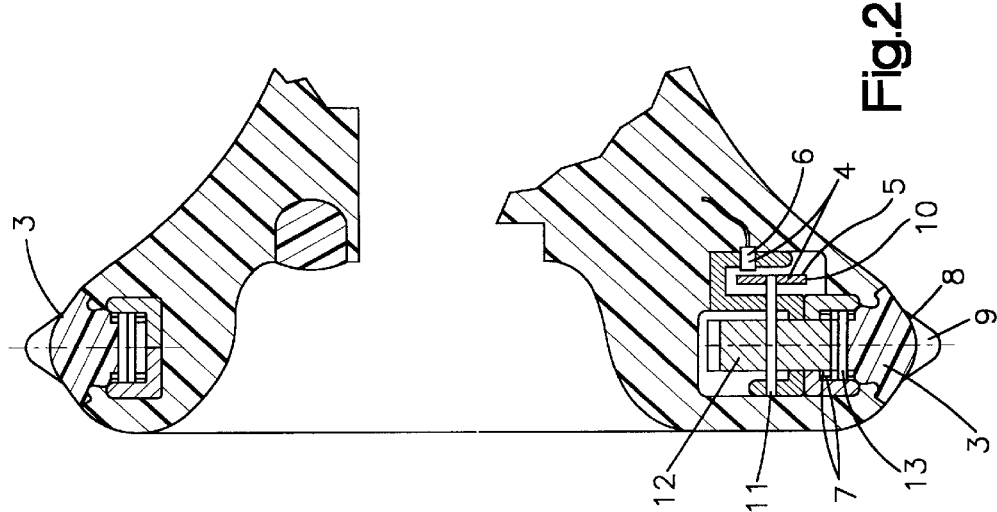

United States Patent [19]
Nigrin et al.

[11] Patent Number: 6,153,996
[45] Date of Patent: *Nov. 28, 2000

[54] STEERING DEVICE WITH AN ACTUATING RING

[75] Inventors: Anke Nigrin, Lohr; Winfried Tschöp, Kreuzwertheim; Martin Kreuzer, Kleinwallstadt; Hans-Jürgen Bossler, Müster; Ulrich Randau, Villingen-Schwenningen, all of Germany

[73] Assignee: TRW Automotive Safety Systems GmbH & Co. KG, Aschaffenburg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/297,727
[22] PCT Filed: Sep. 4, 1998
[86] PCT No.: PCT/EP98/05640
   § 371 Date: May 6, 1999
   § 102(e) Date: May 6, 1999
[87] PCT Pub. No.: WO99/12791
   PCT Pub. Date: Mar. 18, 1999

[30] Foreign Application Priority Data

Sep. 6, 1997 [DE] Germany .......................... 197 39 105

[51] Int. Cl.⁷ ........................................................ B62D 1/04
[52] U.S. Cl. ............................................ 318/489; 318/488
[58] Field of Search ..................... 318/488, 489, 318/490; 180/400, 429, 443, 444; 364/424.05

[56] References Cited

U.S. PATENT DOCUMENTS 3,763,455  10/1973  Confer et al. .
4,421,960  12/1983  Arima et al. .......................... 200/61.54
4,808,146   2/1989  Nogami ................................... 474/101
5,465,632  11/1995  Oki et al. ................................. 74/493
6,000,490  12/1999  Easton ..................................... 180/402

FOREIGN PATENT DOCUMENTS 196 34 102  12/1997  Germany .
  1071907   6/1967  United Kingdom .

*Primary Examiner*—Bentsu Ro
*Attorney, Agent, or Firm*—Tarolli, Sundheim, Covell, Tummino & Szabo L.L.P.

[57] ABSTRACT

A steering device for a motor vehicle is proposed, with an actuating member to introduce a steering movement and with a steering linkage to transfer the steering movement to the wheels.

The steering device is characterized according to the invention in that the actuating member consists of a non-rotatable "steering wheel" (1), in the rim (2) of which a band-shaped or chain-like actuating ring (3), movable relative to the rim (2), and a measured value transmitter (4) for generating an electrical or electronic position signal for the actuating ring (3) are arranged, and that the steering linkage is actuated by an adjustment drive which is controllable by an electrical or electronic regulating device as a function of the position signal.

The proposed mechanical uncoupling between "steering wheel" and "steerable wheels" in combination with the electronic or electrical transmission of the specified steering values on an adjustment drive brings considerable advantages as regards the formation of the transmission ratio between the incipient steering movement and the turning angle of the steered wheels and also for the transmission of the signals between the display and actuating devices on the "steering wheel" and the bodywork.

7 Claims, 1 Drawing Sheet

STEERING DEVICE WITH AN ACTUATING RING

Description

The invention relates to a steering device for a motor vehicle with an actuating member for the introduction of a steering movement and with a steering linkage to transfer the steering movement to the wheels.

The known steering devices consist of a steering wheel which is rotatable by hand, which can be turned from stop to stop usually 3.5 to 4.5 revolutions and the rotary movement of which is transferred via a steering gear mechanically directly to a steering linkage, which brings about the angle of deflection of the steered wheels. Such steering devices have been in use in various forms since the start of the development of automobiles, more revolutions from stop to stop also being able to be provided in buses and lorries, apart from a larger diameter of the steering wheel, in order to improve the transmission ratios in favour of less expenditure of energy. In addition, in particular in passenger cars with front wheel drive, pneumatic steering aids are widely used as so-called power-assisted steering mechanisms.

The direct mechanical coupling between the steering wheel and the steered wheels indeed also has various disadvantages. Firstly, it can not be entirely avoided that unevenness in the roadway, despite intercalated damping devices, is transmitted as far as to the steering wheel as vibrations of greater or lesser intensity, which is not only uncomfortable but also leads to greater fatigue on longer journeys. A further disadvantage consists in that in the design of such steering devices from the outset a decision has to be made for a particular transmission ratio, in which one person finds fault with an insufficient contact with the roadway, whereas for another the same transmission ratio still requires too much power. In addition, the different requirements in driving straight ahead on the motorway on the one hand and when parking on the other hand can not be satisfactorily fulfilled in conventional steering devices or can only be fulfilled with considerable technical expenditure.

In addition to this is the fact that in modern steering wheels, increasingly more actuating devices are arranged so that they can be reached without the hand having to be taken from the steering wheel. In conventional steering devices, the reliability of such actuations depends on the fact that the individual commands can be transferred reliably from the rotatable steering wheel to fixed parts of the bodywork. Also for this a whole range of proven technical solution possibilities in fact already exists, which, however, all have the remainder of a liability to break down and many of which are overloaded in the case of a distinct increase to the actuating devices accommodated on the steering wheel.

The problem therefore exists of indicating a steering device of the type initially mentioned, in which the above-mentioned disadvantages can not occur, which can be easily adapted to the most varied of requirements and in which a plurality of levers and keys for the most varied purposes can be readily arranged on the actuating member, without the signal transmission presenting difficulties.

To solve this problem, a generic steering device is proposed, which is characterized in that the actuating member consists of a non-rotatable "steering wheel", in the rim of which a band-shaped or chain-like actuating ring, movable relative to the rim, and a measured value transmitter to generate an electrical or electronic position signal for the actuating ring are arranged, and that the steering linkage is actuated by an adjustment drive, which is controllable by an electrical or electronic regulating device as a function of the position signal.

In the steering device according to the invention, the term "steering wheel" was continued to be used, although the actuating member is no longer rotatable. Otherwise, however, it can be constructed largely as a conventional steering wheel. The mechanical uncoupling from the steering linkage and the transmission of the steering commands electrically or electronically is important. For this, a band-shaped or chain-like actuating ring is provided, which is movable relative to the rim of the steering wheel. By means of the measured value transmitter, an electrical or electronic position signal is generated for the actuating ring, which is converted in an electrical or electronic regulating device into a control command for an adjustment drive acting on the steering gear.

The steering device according to the invention has the advantage that in the non-rotatable "steering wheel" in a conventional manner an airbag and also actuating and display devices can be accommodated, without a device having to be provided for the transmission of the actuating or display signals from a stationary component to a movable component or vice versa. The steering device according to the invention has in addition the great advantage that as a result of the mechanical uncoupling, in a very simple manner any desired transmission ratios can be realized, because in this respect one only has to take action on the software of the electronic regulating device. Moreover, it is readily possible to select a very direct transmission ratio for driving straight ahead on the motorway and to provide the opposite design range for parking operation.

Figure 1:
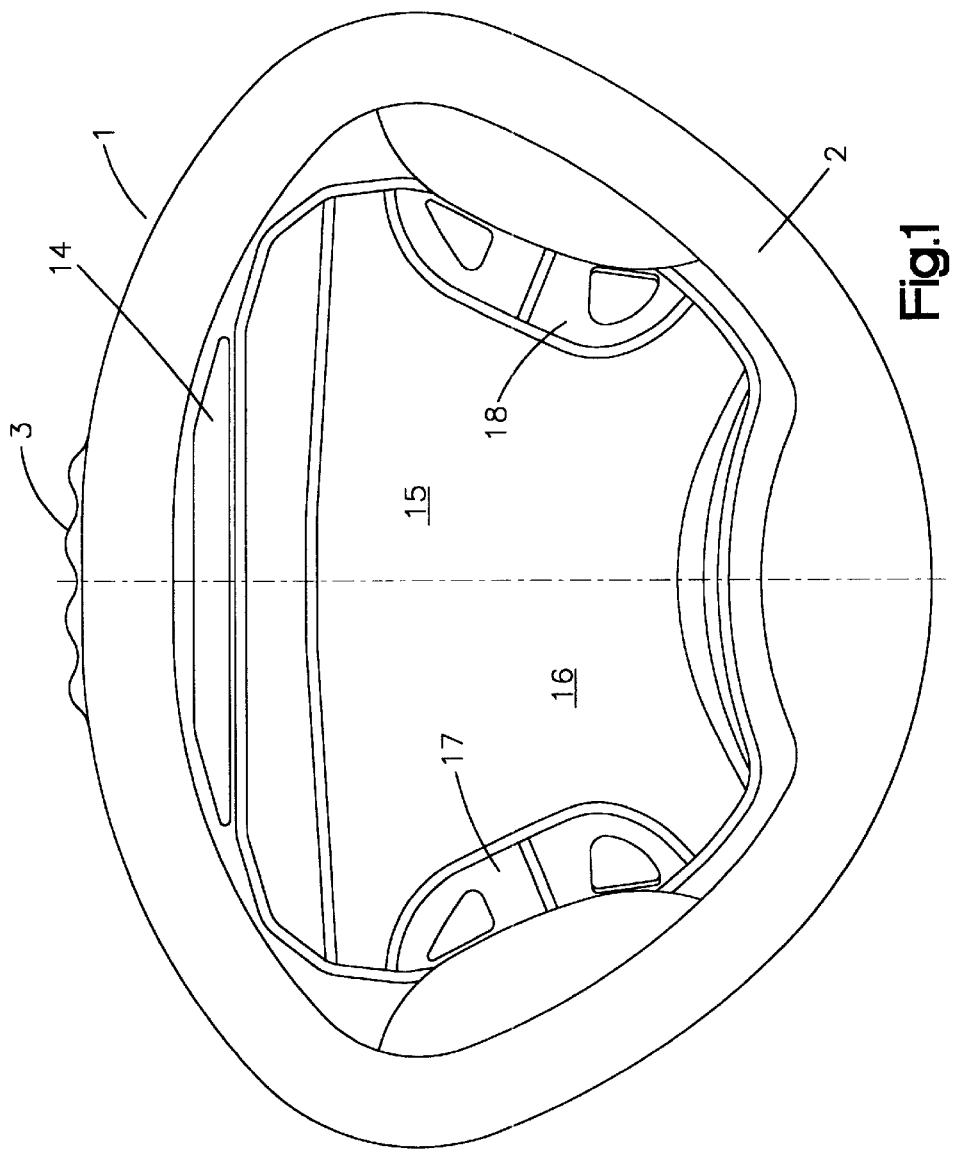

Expedient developments of the idea of the invention are described in sub-claims 2 to 7. Further details are explained more fully with the aid of the example embodiments illustrated in FIGS. 1 and 2, in which:

FIG. 1 shows a top view onto an embodiment of the steering device according to the invention.

FIG. 2 s hows a partial section through the steering device according to FIG. 1.

In FIG. 1 an oval, non-rotatable "steering wheel" 1 is illustrated, deviating from the conventional shape, with a central part 15 in which in a known manner an airbag 16 and various keys and actuating devices 17, 18 are accommodated. In addition, a display device 14 is also provided, which indicates to the driver the position of the actuating ring 3. The actuating ring 3 accommodated in the rim 2 can be seen only indicated in FIG. 1; details of this can be seen from FIG. 2.

In this partial section, substantially only the regions of the steering wheel rim 2 are illustrated, the actuating ring 3 consisting of a link chain 7 and a belt 8 which is connected in non-rotational relationship therewith and has an external grip profile 9. The actuating ring 3 is displaceably mount ed in the rim 2 of the "steering wheel" 1, the driver being able to dictate a steering movement by a displacement of the actuating ring 3 relative to the rim 2 of the fixed "steering wheel" 1, which movement can be evaluated by a measured value transmitter 4 to generate a position signal. The measured value transmitter 4 can consist either of a bar code carrier 5 rotating with the actuating ring and of a stationary reading device, or else, as illustrated in FIG. 2, can consist of a small, rotatable disc 10 with a bar code and of a stationary reading device, the disc 10 being arranged on a shaft 11 for joint rotation therewith, the shaft 11 having a cogwheel 12 the teeth of which engage in carriers 13 of the link chain 7. In this way, a reversibly unique position signal can be generated, which can be converted by an electrical or electronic regulating device into a control signal for the adjustment drive, not illustrated, to actuate the steering link age.

In this connection, it should be obvious that not only is an almost static position signal generated, but that the dynamic movement of the actuating ring leads to corresponding dynamic control commands for the adjustment drive, so that the specified steering values are transferred directly "by wire" to the steerable wheels.

Apart from the advantages already described, in the realization of the idea of the invention, considerable weight advantages can additionally be realized, because the "steering wheel" no longer has to be designed for the transfer of mechanical forces and because components necessary hitherto for the mechanical transfer of the steering movement can be eliminated. In addition, the "steering wheel" can be designed more freely and can be arranged so as to be more easily displaceable for getting in and out, because in this respect no mechanically structural specified data are to be taken into account for the transfer of force. Finally, the steering wheel can also be constructed with less restrictions with a view to the needs of comfort, because it no longer has to be circular.

What is claimed is:

1. A steering device for a motor vehicle with an actuating member to introduce a steering movement and with a steering linkage to transfer the steering movement to the wheels, characterized in that the actuating member consists of a non-rotatable "steering wheel" (1), in the rim (2) of which a band-shaped or chain-like actuating ring (3), movable relative to the rim (2), and a measured value transmitter (4) to generate an electrical or electronic position signal for the actuating ring (3) are arranged, and that the steering linkage is actuated by an adjustment drive, which is controllable by an electrical or electronic regulating device as a function of the position signal.

2. The steering device according to claim 1, characterized in that the measured value transmitter (4) to generate the position signal consists of a bar code carrier (5) rotating with the actuating ring (3) and of a stationary reading device (6) for the bar code.

3. The steering device according to claim 1, characterized in that the actuating ring (3) consists of a link chain (7) and of a belt (8), connected in non-rotational relationship therewith, with an external grip profile (9).

4. The steering device according to claim 3, characterized in that the measured value transmitter (4) to generate the position signal consists of a small, rotatable disc (10) with a bar code and of a stationary reading device (6), the disc (10) being arranged on a shaft (11) for joint rotation therewith, the shaft (11) having a cogwheel (12) the teeth of which engage in carriers (13) of the link chain (7).

5. The steering device according to claim 1, characterized in that in the "steering wheel" (1) a display device (14) is provided, which indicates to the driver the position of the actuating ring (3).

6. The steering device according to claim 1, characterized in that the position signal is processable in the regulating device such that the control command for the adjustment drive deviates more or less from a direct, proportional "transmission" as a function of the "steering wheel turning angle".

7. The steering device according to claim 1, characterized in that the "steering wheel" (1) has a central part (15), in which an airbag (16) and also keys and actuating devices (17–18) are accommodated.

* * * * *